(12) United States Patent
Koike et al.

(10) Patent No.: US 7,084,091 B2
(45) Date of Patent: Aug. 1, 2006

(54) PRODUCTION METHOD OF CERAMIC CATALYST BODY

(75) Inventors: Kazuhiko Koike, Okazaki (JP);
Masakazu Tanaka, Okazaki (JP);
Takumi Suzawa, Okazaki (JP);
Tomomi Hase, Kariya (JP); Tomohiko Nakanishi, Kariya (JP)

(73) Assignees: Denso Corporation, Kariya (JP);
Nippon Soken, Inc., Nishio (JP)

( * ) Notice: Subject to any disclaimer, the term of this patent is extended or adjusted under 35 U.S.C. 154(b) by 0 days.

(21) Appl. No.: 10/793,953

(22) Filed: Mar. 8, 2004

(65) Prior Publication Data
US 2004/0192544 A1 Sep. 30, 2004

(30) Foreign Application Priority Data
Mar. 7, 2003 (JP) ............................. 2003-061773
Jan. 21, 2004 (JP) ............................. 2004-013406

(51) Int. Cl.
*B01J 23/42* (2006.01)
*B01J 23/44* (2006.01)
*B01J 23/00* (2006.01)
*B01J 23/08* (2006.01)
*B01J 20/00* (2006.01)

(52) U.S. Cl. ................. 502/339; 502/313; 502/327; 502/333; 502/334; 502/335; 502/407; 502/415; 502/439; 502/527.19

(58) Field of Classification Search ............... 502/104, 502/439, 355, 415, 64, 87, 527.12, 527.13, 502/178, 200, 263, 400, 407, 524, 525, 305, 502/306, 313, 326–327, 332–334, 339; 501/88, 501/97.1, 133–134
See application file for complete search history.

(56) References Cited

U.S. PATENT DOCUMENTS

| 3,842,017 | A | * | 10/1974 | Armistead et al. .......... 502/339 |
| 3,894,965 | A | | 7/1975 | Foster et al. |
| 3,956,186 | A | | 5/1976 | Iwase et al. |
| 4,189,405 | A | | 2/1980 | Knapton et al. |
| 4,749,671 | A | * | 6/1988 | Saito et al. .................. 502/64 |

(Continued)

FOREIGN PATENT DOCUMENTS

DE 102 52 342 A1 6/2003

(Continued)

OTHER PUBLICATIONS

Office Action and English translation in corresponding Chinese application.

*Primary Examiner*—Cam N. Nguyen
(74) *Attorney, Agent, or Firm*—Nixon & Vanderhye P.C.

(57) ABSTRACT

This invention provides a method for producing a ceramic catalyst body that can directly support a catalyst on a ceramic support without disposing a coating layer on the ceramic support. In the invention, a catalyst solution containing a catalyst component consisting of a negative complex ion resulting from a catalyst precursor is prepared, and a pH of the catalyst solution is adjusted in such a manner as to satisfy the relation $E1>E2$ and $E1>0$ where $E1$ is a surface potential of a matrix phase consisting of a cordierite-W composite body relative to the pH of the catalyst solution and $E2$ is a surface potential of a dispersed phase consisting of compounds other than the cordierite-W composite body. After the ceramic support is brought into contact with the catalyst solution to support the catalyst component, heat-treatment is conducted to bond the matrix phase consisting of the cordierite-W composite body and the catalyst component to support the catalyst on the ceramic support.

10 Claims, 4 Drawing Sheets

U.S. PATENT DOCUMENTS

| | | | |
|---|---|---|---|
| 4,956,329 A | 9/1990 | Chao et al. | |
| 5,258,349 A * | 11/1993 | Dalla Betta et al. | 502/330 |
| 5,338,716 A * | 8/1994 | Triplett et al. | 502/64 |
| 5,346,722 A | 9/1994 | Beauseigneur et al. | |
| 5,384,300 A * | 1/1995 | Feeley et al. | 502/252 |
| 5,489,865 A | 2/1996 | Colvin, Sr. | |
| 5,540,981 A * | 7/1996 | Gallagher et al. | 428/220 |
| 5,556,825 A * | 9/1996 | Shelef et al. | 502/303 |
| 5,607,885 A | 3/1997 | Ichii et al. | |
| 5,716,899 A | 2/1998 | Guile et al. | |
| 6,159,267 A * | 12/2000 | Hampden-Smith et al. | 75/252 |
| 6,171,573 B1 | 1/2001 | Sato | |
| 6,194,083 B1 * | 2/2001 | Yasuda et al. | 428/615 |
| 6,770,590 B1 * | 8/2004 | Watanabe | 502/328 |

FOREIGN PATENT DOCUMENTS

| | | |
|---|---|---|
| EP | 1043067 A2 | 10/2000 |
| EP | 1243329 A1 | 9/2002 |
| JP | 62-4441 | 1/1987 |

* cited by examiner

PRODUCTION METHOD OF CERAMIC CATALYST BODY

BACKGROUND OF THE INVENTION

1. Field of the Invention

This invention relates to a production method of a ceramic catalyst body used for an exhaust gas purification catalyst of an automobile engine, and so forth.

2. Description of the Related Art

Cordierite having high thermal impact resistance has been used widely as a ceramic support in ceramic catalyst bodies according to the prior art. Generally, after a surface of a support formed of cordierite molded into a honeycomb shape is coated with γ-alumina, a precious metal catalyst is carried thereby to produce a ceramic catalyst body (refer to Japanese Examined Patent Publication (Kokoku) No. 5-50338).

The reason why the coating layer is formed is because the surface area of cordierite is relatively small and cannot as such sufficiently support a necessary amount of the catalyst. When the surface of cordierite is coated with γ-alumina having a high specific surface area, the surface area of the support can be increased.

However, coating of the surface of the support with γ-alumina invites the problem that a thermal capacity increases due to the increase of the weight. To quickly activate an exhaust gas purification catalyst, studies have been made in recent years to reduce the thickness of a cell wall of the support and to lower the thermal capacity. Formation of the coating layer lowers the effect of the drop of the thermal capacity.

Furthermore, disposition of the coating layer invites the problems that a coefficient of thermal expansion becomes great and that a pressure loss increases because an open cell area in the honeycomb support decreases.

Fine pores of the coating layer are susceptible to damage due to heat and the surface area decreases with time. The catalyst physically adsorbed into the fine pores is entrapped inside with the decrease of the surface area and the catalyst amount decreases, thereby lowering purification efficiency.

In view of these problems of the prior art described above, the present invention aims at providing a production method of a ceramic catalyst body that can directly support a catalyst on a ceramic support and that does not easily undergo thermal degradation.

SUMMARY OF THE INVENTION

According to a first aspect of the invention, there is provided a method for producing a ceramic catalyst body by directly supporting a catalyst on a ceramic support containing a matrix phase consisting of a cordierite-W composite body and a dispersed phase consisting of compounds other than the cordierite-W composite body, comprising the steps of dissolving a catalyst precursor in a solvent and preparing a catalyst solution containing a catalyst component consisting of a negative complex ion resulting from the catalyst precursor; adjusting a pH of the catalyst solution in such a manner as to satisfy the relation $E1>E2$ and $E1>0$ where $E1$ is a surface potential of the matrix phase of the ceramic support relative to the pH of the catalyst solution and $E2$ is a surface potential of the dispersed phase of the ceramic support; bringing the ceramic support into contact with the catalyst solution to support the catalyst component on the ceramic support; and applying heat-treatment to bond the matrix phase consisting of the cordierite-W composite body and the catalyst component to directly support the catalyst on the ceramic support.

According to a second aspect of the invention, there is provided a method for producing a ceramic catalyst body by directly supporting a catalyst on a ceramic support containing a matrix phase consisting of a cordierite-W composite body and a dispersed phase consisting of compounds other than the cordierite-W composite body, comprising the steps of dissolving a catalyst precursor in a solvent and preparing a catalyst solution containing a catalyst component consisting of a positive complex ion resulting from the catalyst precursor; adjusting a pH of the catalyst solution in such a manner as to satisfy the relation $E1<E2$ and $E1<0$ where $E1$ is a surface potential of the matrix phase of the ceramic support relative to the pH of the catalyst solution and $E2$ is a surface potential of the dispersed phase of the ceramic support; bringing the ceramic support into contact with the catalyst solution to support the catalyst component on the ceramic support; and applying heat-treatment to bond the matrix phase consisting of the cordierite-W composite body and the catalyst component to directly support the catalyst on the ceramic support.

According to a third aspect of the invention, there is provided a method for producing a ceramic catalyst body by directly supporting a catalyst on a ceramic support, the ceramic support consisting of a cordierite-W composite body, or having either oxygen defect or lattice defect in a crystal lattice, or containing fine cracks, comprising the steps of: dissolving a catalyst precursor in a solvent and preparing a catalyst solution containing a catalyst component consisting of a negative complex ion resulting from the catalyst precursor; adjusting a pH of the catalyst solution in such a manner as to satisfy the relation $E1>0$ where $E1$ is a surface potential of the ceramic support relative to the pH of the catalyst solution; bringing the ceramic support into contact with the catalyst solution to support the catalyst component on the ceramic support; and applying heat-treatment to directly support the catalyst component on the ceramic support.

According to a fourth aspect of the invention, there is provided a method for producing a ceramic catalyst body by directly supporting a catalyst on a ceramic support, the ceramic support consisting of a cordierite-W composite body, or having either oxygen defect or lattice defect in a crystal lattice, or containing fine cracks, comprising the steps of dissolving a catalyst precursor in a solvent and preparing a catalyst solution containing a catalyst component consisting of a positive complex ion resulting from said catalyst precursor; adjusting a pH of the catalyst solution in such a manner as to satisfy the relation $E1<0$ where $E1$ is a surface potential of the ceramic support relative to the pH of the catalyst solution; bringing the ceramic support into contact with the catalyst solution to support the catalyst component on the ceramic support; and applying heat-treatment to directly support the catalyst on the ceramic support.

Next, the function and effect of the invention will be explained.

The first and second inventions use a ceramic support containing a matrix phase consisting of a cordierite-W composite body and a dispersed phase consisting of compounds other than the cordierite-W composite body as the ceramic support.

The ceramic support having such a construction is a material in which a part of the crystal lattice of cordierite is replaced by W as will be later explained. This material has a dispersed phase in which a composition other than the cordierite-W composite body is integrated in an island form (refer to later-appearing FIG. 2).

When a catalyst is supported on the cordierite-W composite body of the matrix phase of the ceramic support, chemical bonding that occurs between W in the composite body and the catalyst is utilized in addition to physical adsorption. The dispersed phase of the ceramic support supports the catalyst through physical adsorption.

Therefore, when the catalyst is supported on the ceramic support, a coating layer having a high specific surface area is not necessary, but the catalyst can be directly supported.

However, the bonding strength between the matrix phase and the catalyst is by far higher than the bonding strength between the dispersed phase and the catalyst. Therefore, when the ceramic catalyst body is used under a severe condition such as inside a high temperature atmosphere, the catalyst supported on the dispersed phase moves due to heat, undergoes thermal aggregation and falls off. These are great factors that invite degradation of performance of the ceramic catalyst body.

In the first invention, therefore, a pH of the catalyst solution is adjusted in such a manner as to satisfy the relation E1>E2 and E1>0 where E1 is a surface potential of the matrix phase of the ceramic support relative to the pH of the catalyst solution and E2 is a surface potential of the dispersed phase of the ceramic support, when the catalyst component in the catalyst solution consists of a negative complex ion resulting from the catalyst precursor.

Figure 4:
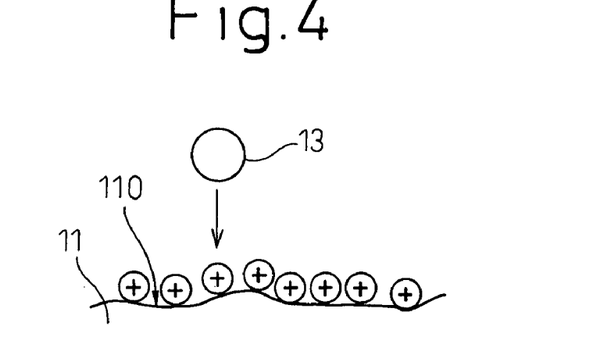
FIG. 4 is an explanatory view of electric attraction acting between a surface of a matrix phase having a positive surface potential and a catalyst component consisting of a negative complex ion.

In other words, when the surface potential E1 of the matrix phase 11 is positive as shown in FIG. 4, electric attraction develops between the matrix phase 1 and the catalyst component 13 because the catalyst component 13 consists of the negative complex ion. As a result, the catalyst component 13 adheres to the surface 110 of the matrix phase 11 of the catalyst support.

Figure 7:
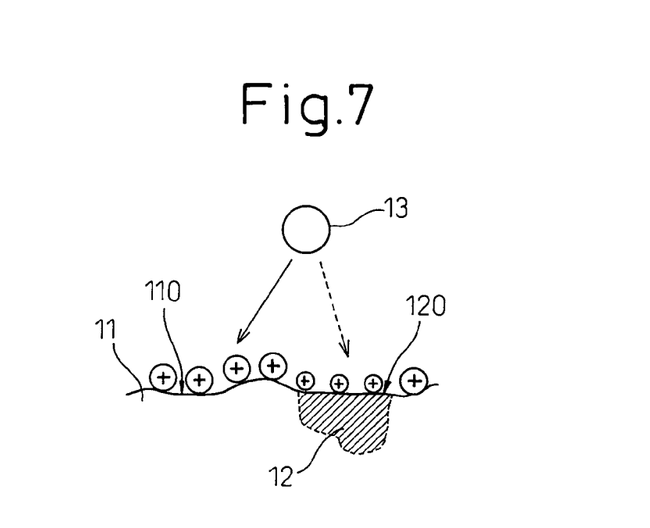
FIG. 7 is an explanatory view of electric attraction acting between a surface of a matrix phase having a positive surface potential and a catalyst component consisting of a negative complex ion.

When the surface potential E1 of the matrix phase 11 is greater than the surface potential E2 of the dispersed phase 12 and both E1 and E2 are positive as shown in FIG. 7, attraction acting between the catalyst component 13 consisting of the negative complex ion and the matrix phase 11 is greater than attraction acting between the catalyst component 13 and the dispersed phase 12. Consequently, the catalyst component 13 consisting of the negative complex ion adheres to the surface 110 of the matrix phase 11 and also to the surface 120 of the dispersed phase 12. However, the adhering amount to the surface 120 of the dispersed phase 12 is smaller.

When the pH of the catalyst solution is adjusted in such a manner as to satisfy the condition as described above, the major part of the catalyst is supported on the matrix phase having a higher bonding strength but is hardly supported on the dispersed phase having a lower bonding strength.

In the second invention, the catalyst component consists of the positive complex ion but the ceramic catalyst in which thermal aggregation and fall-off of the catalyst hardly occur and which has excellent durability can be obtained for the same reason as described above.

In other words, when the surface potentials of both matrix phase and dispersed phase are negative, the major part of the catalyst component adheres to the matrix phase if the surface potential of the matrix phase is smaller than that of the dispersed phase (the matrix phase has a greater surface potential in terms of the absolute value).

Because the amount of the catalyst on the dispersed phase, in which thermal aggregation and fall-off are likely to occur, is small, a ceramic catalyst which is not easily susceptible to the influences of the drop of performance and has excellent durability can be obtained.

When a ceramic catalyst body is produced by directly supporting a catalyst on a ceramic support, the ceramic support in the third and fourth inventions consists of a cordierite-W composite body, or has either oxygen defect or lattice defect in a crystal lattice and contains fine cracks.

In other words, these inventions use as the ceramic support:

(1) a ceramic support consisting of the cordierite-W composite body;

(2) a ceramic support having at least one of oxygen defect and lattice defect in the crystal lattice; and (3) a ceramic support having fine cracks.

As described in the first and second inventions, the ceramic support (1) can utilize the chemical bond occurring between w of the composite body and the catalyst in addition to physical adsorption. Therefore, when the catalyst is supported on the ceramic support, a coating layer having a high specific surface area is not necessary and the catalyst can be supported directly.

When the oxygen defect and the lattice defect exist in the material constituting the ceramic support as described in (2), cracks and fine pores originating from the oxygen defect and the lattice defect are formed on the surface of the ceramic support. The cracks and the fine pores originating from the oxygen defect and the lattice defect are extremely small and have sizes capable of accommodating the catalyst component. Therefore, when the catalyst is supported on the ceramic support, a coating layer having a high specific surface area is not necessary and the catalyst can be directly supported.

When the fine cracks exist in the ceramic support as in (3), the catalyst component can be accommodated in the fine cracks in the same way as in (2) if the catalyst component has a size approximate to the sizes of the fine cracks. Therefore, when the catalyst is supported on the ceramic support, a coating layer having a high specific surface area is not necessary and the catalyst can be directly supported.

In the third invention, a pH of the catalyst solution is adjusted in such a manner as to satisfy the relation E1>0 where E1 is a surface potential of the ceramic support relative to the pH of the catalyst solution, and the ceramic support is brought into contact with the catalyst solution.

Because the surface potential E1 of the ceramic support is positive and the catalyst component consists of the negative complex ion, electric attraction acts between them and the catalyst component adheres to the surface of the catalyst component. Similarly, because the surface potential E1 of the ceramic support is negative and the catalyst component consists of the positive complex ion in the fourth invention, electric attraction acts between them and the catalyst component adheres to the surface of the catalyst component.

When the pH of the catalyst solution is adjusted in such a manner as to satisfy the condition described above, it becomes possible to let the catalyst reliably adhere to the surface of the catalyst support and to conduct baking.

Further, because the catalyst component is sintered after it uniformly adheres to the entire ceramic support, a ceramic support in which portions weak to heat do not partially occur and which is not easily affected by the drop of performance due to thermal aggregation and is excellent in durability can be obtained.

As described above, the first to fourth inventions can provide a production method of a ceramic catalyst body that can directly support a catalyst on a ceramic support without the necessity for disposing a coating layer on the ceramic support and does not easily undergo thermal degradation.

DESCRIPTION OF THE PREFERRED EMBODIMENTS

Figure 6:
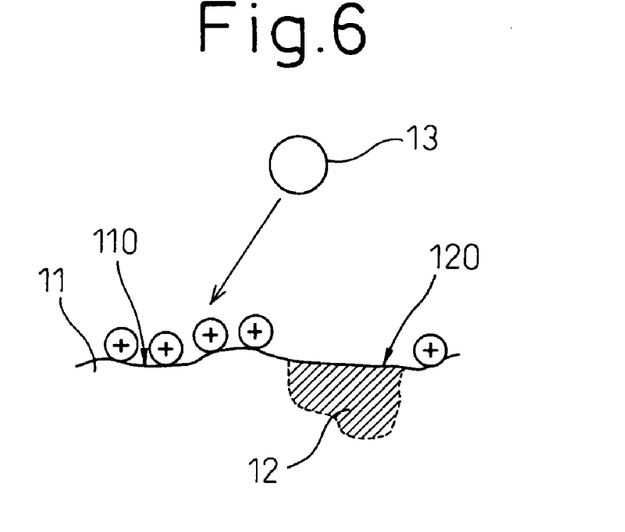
FIG. 6 is an explanatory view of electric attraction acting among a surface of a matrix phase having a positive surface potential, a surface of a dispersed phase having a surface potential of 0 and a catalyst component consisting of a negative complexion.

When the pH of the catalyst solution is adjusted so as to satisfy the relations E1>E2, E1>0 and E2≦0 in the first invention described above, particularly when the surface potential E1 of the matrix phase 11 is positive and the surface potential E2 of the dispersed phase 12 is 0 as shown in FIG. 6, attraction acts between the catalyst component 13 consisting of the negative complex ion and the matrix phase 11 and the major part of the catalyst component 13 consisting of the negative complex ion adheres to the surface 110 of the matrix phase 11. Though electric attraction does not act on the surface 120 of the dispersed phase 12, the catalyst component 13 adheres in some cases due to physical adsorption.

Figure 5:
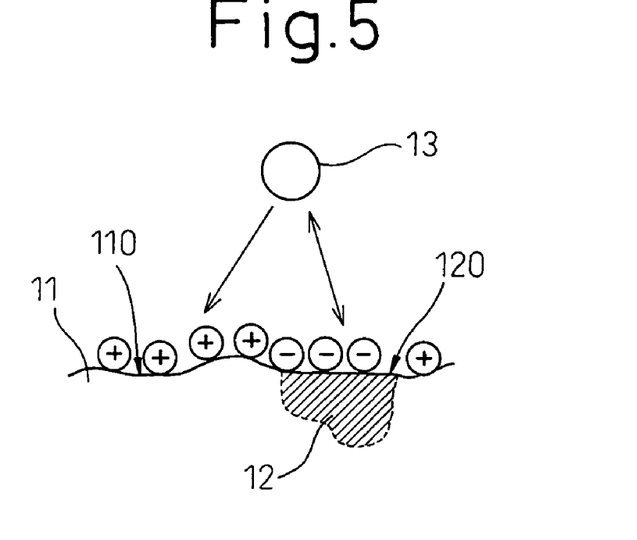
FIG. 5 is an explanatory view of electric attraction and repulsive force acting among a surface of a matrix phase having a positive surface potential, a surface of a dispersed phase having a negative surface potential and a catalyst component consisting of a negative complex ion.

As shown particularly in FIG. 5, when the surface potential E1 of the matrix phase 11 is positive and the surface potential E2 of the dispersed phase 12 is negative, the attraction acts between the catalyst component 5 consisting of the negative complex ion and the matrix phase 11 and the repulsive force acts between the catalyst component 5 and the dispersed phase 12. In consequence, the major part of the catalyst component 13 consisting of the negative complex ion adheres to the surface 110 of the matrix phase 11, but hardly adheres to the surface 120 of the dispersed phase 12.

When the pH of the catalyst solution is adjusted so as to satisfy the relations E1>E2, E1>0 and E2<0 in the first invention, and when the surface potential E1 of the matrix phase 11 is positive with the surface potential E2 of the dispersed phase 12 being negative in this case as shown in FIG. 5, the attraction acts between the catalyst component 5 consisting of the negative complex ion and the matrix phase 11 and the repulsive force acts between the catalyst component 5 and the dispersed phase 12. In consequence, the major part of the catalyst component 13 consisting of the negative complex ion adheres to the surface 110 of the matrix phase 11, but hardly adheres to the surface 120 of the dispersed phase 12.

When the pH of the catalyst solution is adjusted in such a fashion as to satisfy the condition described above, the major part of the catalyst is supported by the matrix phase having the high bonding strength but is hardly supported by the dispersed phase having the low bonding strength.

Therefore, when the ceramic catalyst body is used under a severe condition such as inside a high temperature atmosphere, it is possible to obtain a ceramic catalyst which is not easily susceptible to the drop of performance due to thermal aggregation and which has excellent durability because the amount of the catalyst supported by the dispersed phase in which thermal aggregation and fall-off are likely to occur is small.

When the pH of the catalyst solution is adjusted so as to satisfy the relations E1<E2, E1<0 and E2≧0 in the second invention, the major part of the catalyst component adheres to the matrix phase if the surface potential of the matrix phase is negative and that of the dispersed phase is positive or 0.

When the pH of the catalyst solution is adjusted so as to satisfy the relations E1<E2, E1<0 and E2>0 in the second invention, the major part of the catalyst component adheres to the matrix phase.

Therefore, it is possible to obtain a ceramic catalyst which is not easily susceptible to the drop of performance due to thermal aggregation and which has excellent durability because the amount of the catalyst supported by the dispersed phase in which thermal aggregation and fall-off are likely to occur is small.

Next, the cordierite-W composite body in the first to fourth inventions will be explained.

Cordierite is expressed by the chemical formula (theoretical composition) $2MgO.2Al_2O_3.5SiO_2$ and the composite body has the composition in which Si, Al and Mg of cordierite are replaced by W.

The electron configuration is $[Xe]4f^{14}5d^46s^2$ and has an empty orbit in the d orbit. On the other hand, the oxidation number of W is II, IV, V, VI, etc., and at least two of them exist.

Therefore, W has an energy level approximate to the energy levels of the elements supported as the catalyst, particularly precious metal elements, and exchange of electrons is likely to occur. Because W has at least two oxidation numbers, exchange of electrons is likely to occur with the catalyst. Due to bonding through such an electron exchange, the composite body can be bonded to the catalyst with high bonding strength.

The composite body described above can be prepared in the following way.

The amounts of the elements to be replaced by W are first decreased from the starting materials that attain the theoretical composite ratio of cordierite. The starting materials are then kneaded, molded and dried, and are thereafter dipped into a solution containing a W compound, dried and sintered to give the ceramic support.

Alternatively, the W compound is added to the starting materials which attain the theoretical composite ratio of cordierite and from which the amounts of the elements to be replaced by W are removed. The starting materials are then kneaded, molded, dried and sintered to give the ceramic support.

W that fails to enter the crystal lattice of cordierite and excessive Al, Mg, Si, etc. in the formation of the crystal lattice of cordierite is converted to oxides and composite oxides and remain as the dispersed phase in the matrix phase consisting of the cordierite-W composite body. It is possible to verify, by conducting X-ray diffraction measurement of the ceramic support, that the matrix phase containing cordierite-W composite body and the dispersed phase not containing cordierite exist.

In the production method described above, a ceramic support containing a greater amount of W can be acquired by using a W compound in combination with a titanium compound. In this case, titanium promotes substitution of the elements inside cordierite by w.

Next, the ceramic supports according to the third and fourth inventions will be explained.

The ceramic support consisting of the cordierite-W composite body is the ceramic support having the matrix phase and the dispersed phase represented in the first and second inventions, but the amount of the dispersed phase is small or zero.

Next, a ceramic support having either one of oxygen defect and lattice defect in the crystal lattice will be explained.

The oxygen defect results from deficiency of oxygen forming the crystal lattice of the ceramic support, and the catalyst can be supported in fine pores formed by fall-off of oxygen. To support a catalyst fully exhibiting its sufficient effect as a ceramic catalyst body, the oxygen amount of the crystal lattice is preferably less than 47 wt % of the oxygen amount in the normal crystal lattice.

The lattice defect is the defect formed when oxygen is entrapped in an amount greater than necessary for constituting the crystal lattice of the ceramic support, and the catalyst component can be supported in the fine pores formed by distortion of the crystal lattice and the metal empty lattice points.

To support the catalyst required for fully exhibiting a sufficient effect as the ceramic catalyst body, the oxygen amount of the lattice amount is preferably greater than 48 wt % of the normal crystal lattice. To obtain such a ceramic support, cordierite is preferably used.

Next, a ceramic support having fine cracks will be explained.

The fine cracks must have a width of at least about 0.1 nm and a depth of at least ½ of the diameter of the positive and negative complex ions of the catalyst component and must generally be at least 0.05 nm. To improve the mechanical strength of the ceramic support, the cracks are preferably small.

Further, the width is preferably 100 nm or below. More preferably, the width is 10 nm or below.

As the catalyst component enters these cracks, it adheres to the surface of the ceramic support.

The ceramic support having such fine cracks can be produced by imparting thermal impact or impact waves to the ceramic support that is produced by an ordinary method.

The methods of imparting the thermal impact may use either one of a method that heats the ceramic support and quickly cools it, and a method that quickly cools the ceramic support from a predetermined temperature in the process step of baking and cooling the ceramic support. To generate the cracks by the thermal impact, a temperature difference (thermal impact temperature difference) between the ordinary heating temperature and quick cooling may be at least about 80° C. When the cracks become excessively large, the shape as the ceramic support cannot be maintained easily. Therefore, the thermal impact temperature difference is preferably and generally 900° C. or below.

The cracks according to the invention can also be formed in the ceramic support by imparting the impact wave. In other words, when the portions of the ceramic support having low strength cannot withstand energy of the impact wave, the fine cracks develop. The methods of imparting the impact waves include those using ultrasonic waves and vibration, and the generation quantity of the fine cracks can be controlled by the quantity of energy imparted by the impact waves.

It is possible to use as the ceramic support described above a ceramic support that consists of the cordierite-W composite body, has either the oxygen defect or the lattice defect in the crystal lattice, and that further has the fine cracks.

A ceramic support having the two kinds of features described above can also be used.

Symbols E1 and E2 in the first and second inventions and E1 in the third and fourth inventions are the surface potentials of the cordierite-W composite body to a solvent dissolving the catalyst precursor, the surface potential of the constituent material of the catalyst support and the surface potential of each compound forming the dispersed phase and are respectively measured at a zeta potential. The pH of the catalyst solution is determined on the basis of these E1 and E2.

The method of determining the pH will be explained for the cordierite-W composite body.

First, the zeta potential of the cordierite-W composite body is examined when the pH of the solvent is changed from the acidic side to the alkaline side. Next, the zeta potential of the compound constituting the dispersed phase is examined similarly.

Figure 3:
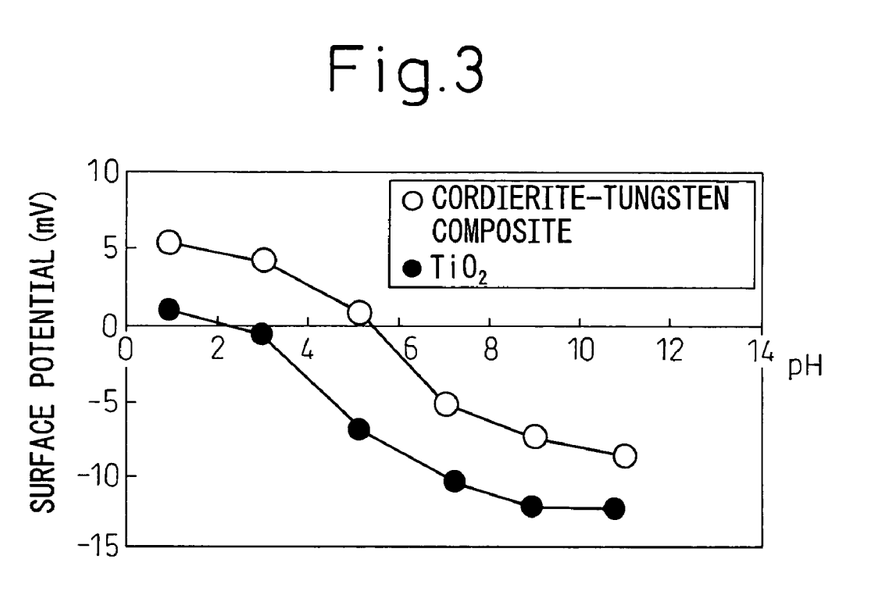
FIG. 3 is a graph showing a relation between surface potentials of a cordierite-W composite body and $TiO_2$ and a pH.

Next, let's consider the case where the result shown in FIG. 3 is obtained as will be described later and when the material consisting of the negative complex ion is selected as the catalyst precursor. Here, let's consider the ceramic support in which the dispersed phase consists of only $TiO_2$.

The composite body as the matrix phase has a pH of 5.5 and a surface potential of 0, and $TiO_2$ as the dispersed phase has a pH of 2.1 and a surface potential of 0. The surface potential becomes lower in both the composite body and $TiO_2$ as the pH becomes greater.

Therefore, when the ceramic support is dipped into the catalyst solution the pH of which is adjusted to 5.5 or below, a greater amount of the catalyst can be supported in the matrix phase than in the dispersed phase. For, when the pH is less than 5.5, the surface of the matrix phase is charged to the positive polarity and well attracts the catalyst component consisting of the negative complex ion. When the pH is 2.1 or above, the surface potential of the dispersed phase is charged to the negative polarity, and the catalyst component consisting of the negative complex ion hardly adheres to the dispersed phase.

Consequently, in the case considered here, the effect of the invention can be acquired by adjusting the pH to 5.5 or below.

To further reduce the amount of the catalyst component adhering to the dispersed phase, the pH is preferably adjusted to 2.1 or above and 5.5 or below. In this case, the repulsive force acts between the dispersed phase and the catalyst component or the electric attraction does not operate between them as shown in FIGS. 5 and 6, so that the catalyst component cannot easily adhere to the dispersed phase.

Figure 8:
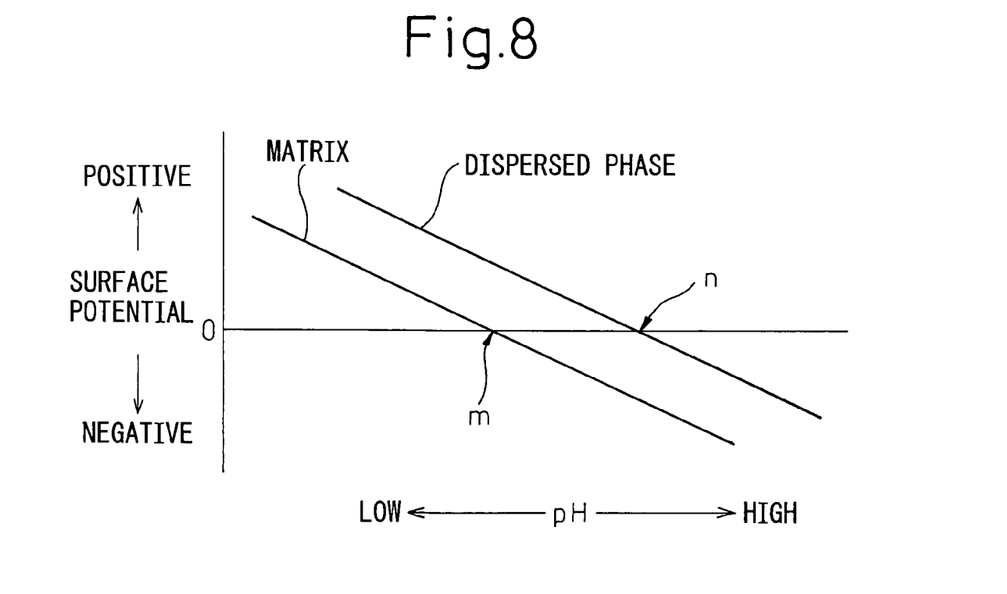
FIG. 8 is a graph showing a relation between a surface potential of each of a matrix phase and a dispersed phase and a pH.

Next, let's consider the case where the result shown in FIG. 8 is obtained and the catalyst component selects the material consisting of a positive complex ion as the catalyst precursor.

The composite body as the mother material has a pH of m and a surface potential of 0, and the dispersed phase has a pH of n and a surface potential of 0. The surface potential drops in both of the composite body and the dispersed phase as the pH becomes greater.

Therefore, when the ceramic support is dipped into the catalyst solution the pH of which is adjusted to be greater than m, a greater amount of the catalyst can be supported in the matrix phase than in the dispersed phase. When the pH is greater than m, the surface of the matrix phase is charged to the negative polarity and well attracts the catalyst component consisting of the positive complex ion. When the pH is n or below, the surface potential of the dispersed phase is charged to the positive polarity, and the catalyst component consisting of the positive complex ion hardly adheres to the dispersed phase.

Consequently, in the case considered hereby, the effect of the invention can be acquired by adjusting the pH to m or above.

To further reduce the amount of the catalyst component adhering to the dispersed phase in the first and second inventions, the pH is preferably so adjusted as to be greater than m and smaller than n. In consequence, the repulsive force acts between the dispersed phase and the catalyst component or the electric force does not operate between them in this case, so that the catalyst component cannot easily adhere to the dispersed phase.

When the dispersed phase consists of a plurality of components in the first and second inventions, the pH of the catalyst solution can be determined from the observation described above about the component that forms the dispersed phase having the largest occupying area on the surface of ceramic support.

The determination of the pH of ceramic supports other than the cordierite-W composite body can be determined in the same way as the composite body described above.

Incidentally, a measurement example of the zeta potential will be described in Examples.

In the first to fourth inventions, the catalyst solution is prepared by dissolving the catalyst precursor in the solvent. The solvent is decided in accordance with the kind of the catalyst precursor, and the catalyst precursor, too, is selected in accordance with the kind of the catalyst to be supported. The catalyst precursor forms the catalyst component consisting of the negative or positive complex ion in the catalyst solution.

When the pH of the catalyst solution is adjusted in such a manner as to satisfy the conditions of the first to fourth inventions, an acid or an alkali is preferably titrated. In this case, those materials which do not corrode the ceramic support and do not either react easily with the catalyst precursor, the solvent and the negative and positive complex ions as the catalyst components must be selected as the acid and the alkali.

Depending on the kind of the catalyst precursor, a catalyst solution targeted to a desired pH can be prepared by adjusting the amount of the catalyst precursor dissolved in the solvent.

The ceramic catalyst bodies according to the first to fourth inventions can support a three-way catalyst, an oxidation catalyst and a de-odorizing catalyst using a precious metal catalyst such as platinum, palladium or rhodium as the base.

It is preferred to use water as the solvent and at least one kind of compound selected from the group consisting of hexachloro-platinic acid, tetraammine-platinum nitrate, tetraammine-palladium chloride, ammonium hexachlororhodinate acid, dinitrodiammine-platinum nitrate, tetraammine platinum chloride, palladium chloride and palladium nitrate.

In this way, the catalyst complex ion can be adsorbed selectively to the matrix phase (in the case of the first and second inventions) and strongly (in the first to fourth inventions).

When the catalyst precursor and the solvent described above are selected, nitric acid or ammonium is used for the pH adjustment. A catalyst solution having a desired pH can be prepared by adjusting the dissolution amount of the catalyst precursor.

EXAMPLE 1

This example represents a method for producing a ceramic catalyst body by supporting a catalyst on a ceramic support containing a matrix phase consisting of a cordierite-W composite body and a dispersed phase consisting of a compound other than the cordierite-W composite body.

In other words, the catalyst precursor is dissolved in the solvent to produce the catalyst solution containing the catalyst component consisting of the negative complex ion generated from the catalyst precursor.

Next, the pH of the catalyst solution is adjusted so as to satisfy the relation E1>E2 and E1>0 where E1 is a surface potential of the matrix phase of the ceramic support to the pH of the catalyst solution and E2 is the surface potential of the dispersed phase of the ceramic support. The ceramic support is then brought into contact with the catalyst solution.

After the catalyst component is supported on the ceramic support, heat-treatment is carried out to bond the matrix phase consisting of the cordierite-W composite body and the catalyst component and to support the catalyst on the ceramic support.

Next, the explanation will be given in detail.

Figure 1:
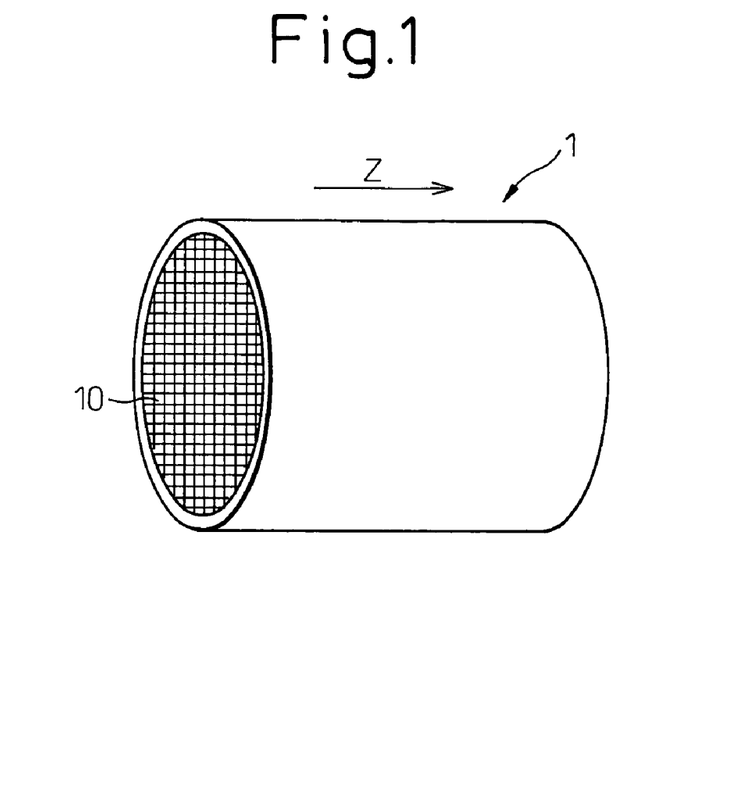
FIG. 1 shows as a whole a ceramic catalyst body according to Embodiment 1.

The ceramic catalyst body 1 in this example uses the ceramic support as the base and includes the exhaust gas purification catalyst supported on the surface of the ceramic support as shown in FIG. 1. The ceramic catalyst body 1 is used for purifying the exhaust gas emitted from an automobile engine while fitted to an exhaust pipe of the automobile engine.

The ceramic support of this example is a honeycomb structure and has a large number of cells 10 operating as flow paths of the exhaust gas for the operation of the catalyst. The catalyst is mainly supported on the wall surface facing the gas flow paths. An arrow Z shown in FIG. 1 represents the flow path direction of the exhaust gas for which the catalyst is to operate.

The ceramic support of this example includes the matrix phase consisting of the cordierite-W composite body and the dispersed phase consisting of a compound other than the cordierite-W composite body.

The matrix phase has a composition prepared by replacing the Al element of the cordierite by W. The dispersed phase does not contain the composite body and is formed of titanium oxide, etc., added to promote W substitution as will be described in a later-appearing production method.

Figure 2:
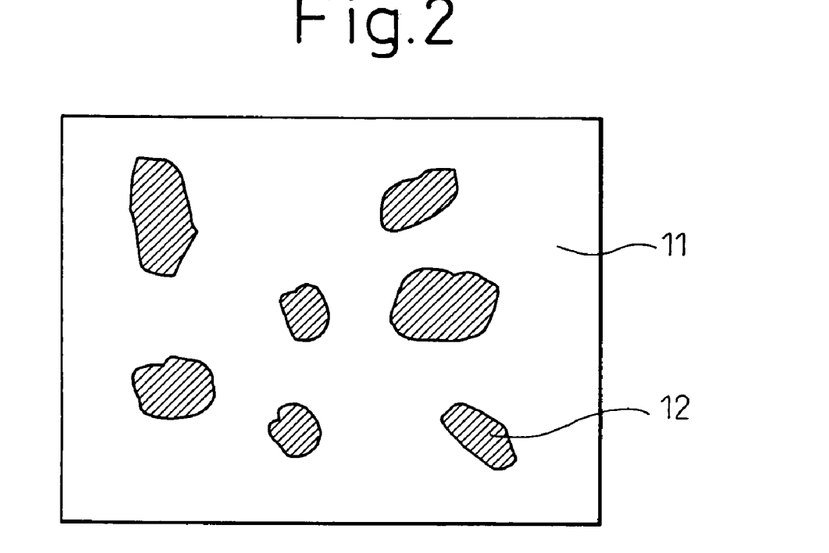
FIG. 2 is a schematic view showing a structure of a ceramic support in Embodiment 1.

FIG. 2 is a schematic view of the composition of the ceramic support. The dispersed phase 12 is deposited in the island form to the matrix phase 11 as shown in the drawing.

Next, the production method of the ceramic catalyst body in this example will be explained.

Talc, molten silica and aluminum hydroxide are prepared as the cordierite materials. $WO_3$ is prepared as the W source and $TiO_2$ is prepared as a material for promoting W substitution to allow W to easily enter cordierite.

Suitable amounts of a binder (methyl cellulose), a lubricant, a humectant (polyhydric alcohol derivative) and moisture are added to these materials, and the mixture is kneaded and converted to clay.

The resulting clay-like material is thereafter shaped into a honeycomb shape having a cell wall thickness of 100 μm, a cell density of 400 psi and a diameter of 50 mm, is dried and is sintered at 1,290° C. in open air. When the ceramic component of this honeycomb structure is analyzed by X-ray diffraction, it is found that cordierite and $TiO_2$ mainly exist.

When Rietveld analysis is made from X-ray diffraction of this cordierite, it is confirmed that Al is substituted by W.

Next, the support is supported on the ceramic support described above.

In this example, hexachloroplatinic(IV) acid as the catalyst precursor is dissolved in water as the solvent to prepare the catalyst solution containing the catalyst component $[PtCl_6]^{2-}$ as the negative complex ion.

Incidentally, the zeta potentials are measured for the surface potential of the cordierite-W composite body and the surface potential of $TiO_2$ by a streaming potential system and the result is shown in FIG. 3.

As can be seen clearly from FIG. 3, the surface potential of the cordierite-W composite body is positive when the pH is lower than 5.5. The surface potential of $TiO_2$ is lower than that of the cordierite-W composite body irrespective of the pH.

The pH at which the surface potential of the cordierite-W composite body is positive and the surface potential of $TiO_2$ is negative is greater than 2.1 and the surface potential of the cordierite-W composite body becomes greater when the pH becomes smaller.

When the surface potential of the cordierite-W composite body becomes greater, the attraction acting between the cordierite-W composite body and the catalyst component consisting of the negative complex ion becomes greater, too.

Here, when the catalyst solution is prepared, the necessary amount of hexachloroplatinic acid is dissolved in water and is then adjusted with nitric acid to obtain the catalyst solution having the pH of 2.2. The ceramic support is dipped in this state into the catalyst solution at room temperature for 5 minutes with stirring. Thereafter the ceramic support to which the catalyst component adheres is pulled out from the catalyst solution, and is dried and sintered.

The ceramic catalyst body supporting Pt is thus obtained.

When the amount of Pt supported on this ceramic catalyst body is measured, it is 1 g/l.

When the support condition of platinum is examined with a TEM (transmission electron microscope) in the ceramic catalyst body prepared by the method described above, a large number of platinum particles of several nm can be confirmed on the surface of the matrix phase consisting of the cordierite-W composite body. However, the platinum particles hardly exist on the surface of the dispersed phase consisting of $TiO_2$.

For comparison, the same ceramic support is dipped in an aqueous solution of tetraammine-platinic nitrate, dried and sintered to support Pt on the surface at a rate of 1 g/l.

The aqueous solution of tetraammine-platinic nitrate has a pH of 0.6 and the traammineplatinum ion is a positive complex ion. From FIG. 3 described above, the surface potentials of both $TiO_2$ and the cordierite-W composite body are negative at pH 8.6 and the absolute value of the surface potential of $TiO_2$ is greater than that of the composite body.

When the support condition of platinum is examined through TEM (transmission electron microscope) for the ceramic catalyst body of Comparative Example, the platinum particles of about several nm are confirmed on the surface of the matrix phase consisting of the cordierite-W composite body but the platinum particles of about 10 nm are also confirmed on the surface of the dispersed phase consisting of $TiO_2$. In other words, greater amounts of the platinum particles are supported on the dispersed phase.

It can thus be found from the result given above that the production method of this example can produce the ceramic catalyst body by selectively supporting the platinum particles on the matrix phase.

The function and effect of this example will be explained.

This example uses the ceramic support containing the matrix phase consisting of the cordierite-W composite body and the dispersed phase consisting of $TiO_2$ other than the cordierite-W composite body.

The ceramic support having such a composition is the material obtained by replacing a part of the crystal lattice of cordierite by W, and the catalyst is firmly supported on the matrix phase by physical adsorption and chemical bonding that occurs between w in the composite body and the catalyst.

Therefore, the catalyst can be directly supported on the ceramic support without separately disposing the coating phase having a high specific surface area that has been used in the past.

When the ceramic catalyst body is produced by the production method of this example, the catalyst can be selectively supported on the matrix phase in the ceramic support.

Therefore, because the amount of the catalyst supported on the dispersed phase, in which thermal aggregation and fall-off are likely to occur, is small, it is possible to obtain the ceramic catalyst that is not easily susceptible to the influences of the drop of performance due to thermal aggregation and has high durability.

This example can provide the production method of the ceramic catalyst body that can directly support the catalyst on the ceramic support without disposing the coating layer on the ceramic support and that does not easily undergo thermal degradation.

EXAMPLE 2

This example examines comparatively the purification performance as the exhaust gas purification catalyst between the ceramic catalyst body of the invention described in Example 1 and a catalyst body further supporting 0.2 g/l of rhodium by an impregnation method in the ceramic catalyst body as a Comparison Example.

The ceramic catalyst body used in this example has a shape of a circular cylinder having a diameter of 30 mm and a length of 50 mm (in the direction of the arrow Z in FIG. 1) in the axial direction.

To evaluate the purification performance, a 50% purification temperature of hydrocarbon (HC) is measured with a model bench gas having the same composition as the exhaust gas emitted from an automobile while driving at a constant speed of 40 kg/hr. As a thermal durability condition, the sample is left standing inside an electric furnace at 800° C. for 5 hours in open atmosphere.

The initial 50% purification temperature of the ceramic catalyst body according to the invention is 243° C. and is 243° C. after thermal durability. In other words, the 50% purification temperature does not change after thermal durability, too.

In the Comparative Example, the initial 50% purification temperature of the ceramic catalyst body is 230° C. but rises to 252° C. after thermal durability.

In other words, the temperature difference is 22° C. before and after thermal durability. It is thus found that degradation proceeds after thermal durability in the ceramic catalyst body of Comparative Example.

This is because the catalyst is mainly supported on the matrix phase in the ceramic catalyst body according to the invention whereas the catalyst is mainly supported on the dispersed phase in the ceramic catalyst body according to the Comparative Example. In the invention in which the catalyst is supported on the matrix phase, the catalyst and the matrix phase have a high bonding strength. Therefore, aggregation of the catalyst due to thermal durability can be prevented and degradation of the catalyst due to thermal durability can be suppressed.

In the ceramic catalyst body according to the Comparative Example in which the catalyst is supported on the dispersed phase capable of supporting the catalyst only through physical adsorption, too, the retention strength of the catalyst is low, the catalyst undergoes aggregation due to thermal durability and the purification performance deteriorates.

What is claimed is:

1. A method for producing a ceramic catalyst body by directly supporting a catalyst on a ceramic support containing a matrix phase consisting of a cordierite-W composite body and a dispersed phase consisting of compounds other than said cordierite-W composite body, comprising the steps of:
    dissolving a catalyst precursor in a solvent and preparing a catalyst solution containing a catalyst component consisting of a negative complex ion resulting from said catalyst precursor;
    adjusting a pH of said catalyst solution in such a manner as to satisfy the relation $E1>E2$ and $E1>0$ where $E1$ is a surface potential of the matrix phase of said ceramic support relative to the pH of said catalyst solution and $E2$ is a surface potential of the dispersed phase of said ceramic support;
    bringing said ceramic support into contact with said catalyst solution to support said catalyst component on said ceramic support; and
    applying heat-treatment to bond the matrix phase consisting of said cordierite-W composite body and said catalyst component to directly support said catalyst on said ceramic support.

2. A method for producing a ceramic catalyst body according to claim 1, wherein the pH of said catalyst solution is adjusted in such a manner as to satisfy the relation $E1>E2$, $E1>0$ and $E2\leq0$.

3. A method for producing a ceramic catalyst body according to claim 1, wherein the pH of said catalyst solution is adjusted in such a manner as to satisfy the relation $E1>E2$, $E1>0$ and $E2<0$.

4. A method for producing a ceramic catalyst body by directly supporting a catalyst on a ceramic support containing a matrix phase consisting of a cordierite-W composite body and a dispersed phase consisting of compounds other than said cordierite-W composite body, comprising the steps of:
    dissolving a catalyst precursor in a solvent and preparing a catalyst solution containing a catalyst component consisting of a positive complex ion resulting from said catalyst precursor;
    adjusting a pH of said catalyst solution in such a manner as to satisfy the relation $E1<E2$ and $E1<0$ where $E1$ is a surface potential of the matrix phase of said ceramic support relative to the pH of said catalyst solution and $E2$ is a surface potential of the dispersed phase of said ceramic support;
    bringing said ceramic support into contact with said catalyst solution to support said catalyst component on said ceramic support; and
    applying heat-treatment to bond the matrix phase consisting of said cordierite-W composite body and said catalyst component to directly support said catalyst on said ceramic support.

5. A method for producing a ceramic catalyst body according to claim 4, wherein the pH of said catalyst solution is adjusted in such a manner as to satisfy the relation $E1<E2$, $E1<0$ and $E2>0$.

6. A method for producing a ceramic catalyst body according to claim 4, wherein the pH of said catalyst solution is adjusted in such a manner as to satisfy the relation $E1<E2$, $E1<0$ and $E2>0$.

7. A method for producing a ceramic catalyst body by directly supporting a catalyst on a ceramic support consisting of a cordierite-W composite body, said ceramic support having either oxygen defect or lattice defect in a crystal lattice, or containing fine cracks, comprising the steps of:
    dissolving a catalyst precursor in a solvent and preparing a catalyst solution containing a catalyst component consisting of a negative complex ion resulting from said catalyst precursor;
    adjusting a pH of said catalyst solution in such a manner as to satisfy the relation $E1>0$ where $E1$ is a surface potential of said ceramic support relative to the pH of said catalyst solution;
    bringing said ceramic support into contact with said catalyst solution to support said catalyst component on said ceramic support; and
    applying heat-treatment to directly support said catalyst component on said ceramic support.

8. A method for producing a ceramic catalyst body according to claim 7, wherein said fine cracks have a width of not greater than 100 nm.

9. A method for producing a ceramic catalyst body by directly supporting a catalyst on a ceramic support, consisting of a cordierite-W composite body, said ceramic support having either oxygen defect or lattice defect in a crystal lattice, or containing fine cracks, comprising the steps of:
    dissolving a catalyst precursor in a solvent and preparing a catalyst solution containing a catalyst component consisting of a positive complex ion resulting from said catalyst precursor;
    adjusting a pH of said catalyst solution in such a manner as to satisfy the relation $E1<0$ where $E1$ is a surface potential of said ceramic support relative to the pH of said catalyst solution;
    bringing said ceramic support into contact with said catalyst solution to support said catalyst component on said ceramic support; and
    applying heat-treatment to directly support said catalyst on said ceramic support.

10. A method for producing a ceramic catalyst body according to claim 9, wherein said solvent is water, and said catalyst precursor is at least one kind of compound selected from the group consisting of hexachloroplatinic acid, tetraammine-platinic nitrate, tetraammine-palladium chloride, ammonium hexachloro-rhodinate, dinitrodiammine-platinic nitrate, tetraammine-platinic chloride, palladium chloride and palladium nitrate.

* * * * *